(12) United States Patent
Choi et al.

(10) Patent No.: US 7,202,312 B2
(45) Date of Patent: Apr. 10, 2007

(54) METHOD FOR PREPARING CYCLIC OLEFIN POLYMER HAVING HIGH BULK DENSITY AND CYCLIC OLEFIN POLYMER PREPARED THEREBY

(75) Inventors: Chul-Hwan Choi, Daejeon (KR); Sung-Yeon Kim, Daejeon (KR); Jung-Uk Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/050,833

(22) Filed: Jan. 27, 2005

(65) Prior Publication Data

US 2005/0171258 A1   Aug. 4, 2005

(30) Foreign Application Priority Data

Jan. 29, 2004   (KR) .................. 10-2004-0005716

(51) Int. Cl.
*C08F 132/00*   (2006.01)
(52) U.S. Cl. .......................... 526/79; 526/281
(58) Field of Classification Search .......... 526/79, 526/282
See application file for complete search history.

(56) References Cited

U.S. PATENT DOCUMENTS

| 4,400,501 A | 8/1983 | Lane et al. |
| 4,414,386 A | 11/1983 | Lane |
| 6,455,650 B1 | 9/2002 | Lipian et al. |
| 6,723,486 B2 * | 4/2004 | Goodall et al. .......... 430/270.1 |

FOREIGN PATENT DOCUMENTS

| EP | 0-610-813 A1 | 8/1994 |
| JP | 62-215611 | 9/1987 |
| JP | 11-158225 | 6/1999 |

* cited by examiner

*Primary Examiner*—Robert D. Harlan
(74) *Attorney, Agent, or Firm*—McKenna Long & Aldridge LLP

(57) ABSTRACT

A method for preparing a cyclic olefin polymer is described. The method includes polymerizing cyclic olefin monomers or a cyclic olefin monomer with ethylene to prepare a cyclic olefin polymer solution; slowly adding a non-solvent drop wise to the cyclic olefin polymer solution to precipitate a cyclic olefin polymer; and filtering and drying the precipitated cyclic olefin polymer. In addition, the cyclic olefin polymer prepared using this method is described. According to the present invention, a spherical cyclic olefin polymer having a high bulk density can be easily separated from the cyclic olefin polymer solution by precipitation.

7 Claims, 1 Drawing Sheet

METHOD FOR PREPARING CYCLIC OLEFIN POLYMER HAVING HIGH BULK DENSITY AND CYCLIC OLEFIN POLYMER PREPARED THEREBY

CROSS-REFERENCE TO RELATED APPLICATIONS

This application claims the benefit of Korean Patent Application No. 10-2004-0005716, filed Jan. 29, 2004 in Korea, which is hereby incorporated by reference in its entirety.

BACKGROUND OF THE INVENTION (a) Field of the Invention

The present invention relates to a method for preparing a cyclic olefin polymer and a cyclic olefin polymer prepared thereby, more particularly to a method for preparing a cyclic olefin polymer having a high bulk density and a cyclic olefin polymer prepared thereby.

(b) Description of the Related Art

Until now, inorganic materials such as silicon oxide or silicon nitride have been used in the field of information technology and electronics industry. As the need for compact and highly efficient devices increases, new materials having superior functionality are required. In this regard, polymers having a low dielectric constant and a low hygroscopy, superior metal adhesivity, rigidity, thermal stability and transparency, and a high glass transition temperature ($T_g$>250° C.) are drawing attention.

Such polymers may be used for insulating films of semiconductors or TFT-LCDs, protection films for polarizing panels, multichip modules, integrated circuits (IC), printed circuit board, molding compounds for electronics devices, optical materials for flat panel displays, etc.

For example, the cyclic olefin polymer, which is polymerized from a cyclic monomer such as norbornene, has better transparency, heat resistance and chemical resistance than the conventional olefinic polymers and very low birefringence and hygroscopy. Thus, it can be used for optical materials for CDs, DVDs and POF (plastic optical fiber), films for capacitors, low-dielectric IT materials, medicinal materials such as low hygroscopic syringes, blister packaging, etc.

Steam stripping has been employed as a method for obtaining a polymer having a high glass transition temperature. However, polymer obtained by this method has coarse and non-uniform particles. Also, it is difficult to dry the water added during the process and remove the monomer or the metallic catalyst. Moreover, the method is inefficient and consumes a lot of energy because a huge amount of steam has to be used.

U.S. Pat. No. 4,400,501 discloses a process of mixing a polymer solution and a non-solvent using a high shear stirrer to precipitate the polymer and filtering and drying the precipitated polymer. However, the polymer obtained by this process has irregular fluffy, fibery particles, whose bulk density being as low as 0.06–0.08 g/mL. Thus, a large amount of non-solvent should be used to discharge the slurry from the precipitation tank and transfer and wash it and drying is also inefficient because of low bulk density. So the productivity is very low.

U.S. Pat. No. 6,455,650 discloses a process of pouring a polymer solution into a non-solvent to precipitate the polymer and filtering and drying it. The polymer obtained by this process has irregular fluffy, fibery particles, whose bulk density is very low. Because the polymer solution has a small concentration, a large amount of solvent has to be used.

U.S. Pat. No. 4,414,386 discloses a process of mixing a non-solvent containing an alcohol and water with a polymer solution to precipitate the polymer. The polymer obtained by this process has somewhat long particles and the bulk density is increased to 0.16 g/mL. However, it is difficult to separate the water from the alcohol and the bulk density needs to be further improved.

SUMMARY OF THE INVENTION

The present inventors found that, in precipitating a polymer from a polymer solution and separating it in the preparation of a cyclic olefin polymer, a cyclic olefin polymer having a high bulk density can be precipitated by slowly adding a non-solvent drop wise to a polymer solution, rather than mixing a polymer solution with a non-solvent or pouring a polymer solution to a non-solvent as in the conventional methods.

Thus, it is an object of the present invention to provide a method for preparing a cyclic olefin polymer and the cyclic olefin polymer prepared thereby. The cyclic olefin polymer may have a high bulk density and be prepared by precipitating the cyclic polymer from a cyclic olefin polymer solution.

To attain the object, the present invention provides a method for preparing a cyclic olefin polymer comprising the steps of:

a) polymerizing cyclic olefin monomers or a cyclic olefin monomer with ethylene to prepare a cyclic olefin polymer solution;

b) slowly adding a non-solvent to the cyclic olefin polymer solution to precipitate the cyclic olefin polymer; and c) filtering and drying the precipitated cyclic olefin polymer.

The present invention also provides a cyclic olefin polymer having a bulk density of 0.1–0.6 g/mL.

DETAILED DESCRIPTION OF THE PREFERRED EMBODIMENTS

Figure 1:
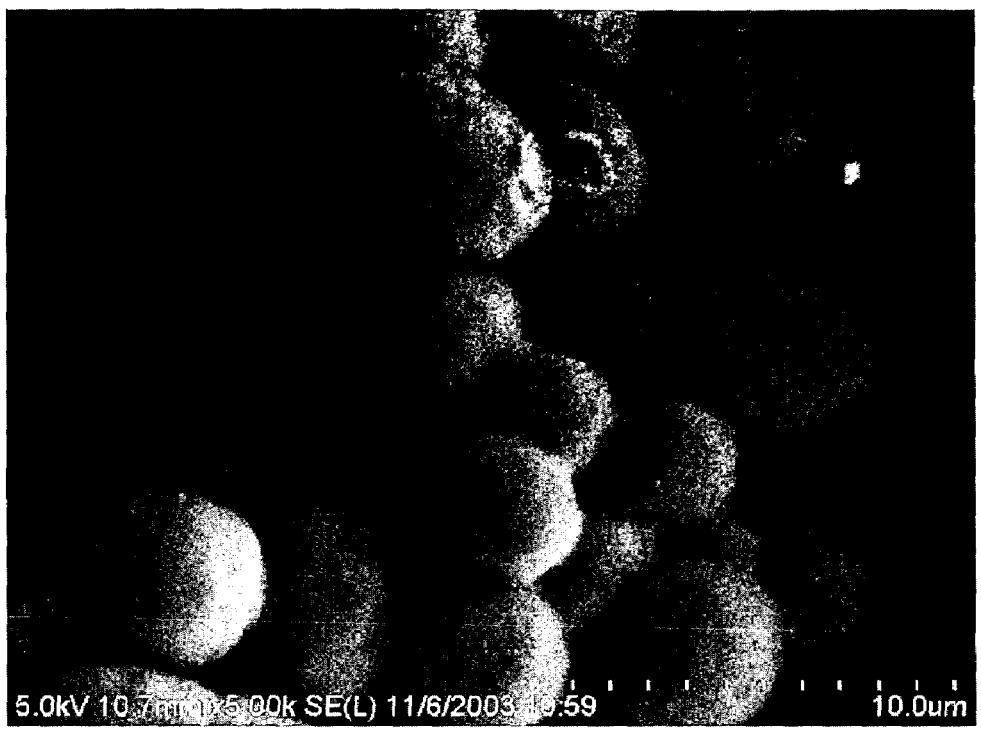
FIG. 1 is a scanning electron micrograph (SEM) of the spherical cyclic olefin polymer prepared in Example 1.

A more detailed description of the present invention follows below.

In the present invention, a cyclic olefin polymer refers to a polymer prepared from polymerization of cyclic olefin monomers or a cyclic olefin monomer and ethylene.

For example, the cyclic olefin polymer may be a polymer selected from the group consisting of a homopolymer prepared from norbornene based monomers, which are represented by Chemical Formula 1 below; a copolymer of different monomers, which are represented by Chemical Formula 1; and a copolymer prepared from a norbornene based monomer represented by Chemical Formula 1 and ethylene:

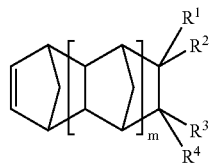

(1)

where m is an integer of 0 to 4;

each of $R^1$, $R^2$, $R^3$ and $R^4$ is selected from the group consisting of a $C_1$–$C_{20}$ linear or branched alkyl, a $C_2$–$C_{20}$ alkenyl or vinyl; a $C_5$–$C_{12}$ cycloalkyl substituted by a $C_1$–$C_{20}$ hydrocarbon or unsubstituted; a $C_6$–$C_{20}$ aryl substituted by a $C_1$–$C_{20}$ hydrocarbon or unsubstituted; a $C_7$–$C_{15}$ aralkyl substituted by a $C_1$–$C_{20}$ hydrocarbon or unsubstituted; a $C_3$–$C_{20}$ alkynyl; and a polar functional group selected —$(CH_2)_nC(O)OR^5$, —$(CH_2)_nOC(O)R^5$, —$(CH_2)_nOC(O)OR^5$, —$(CH_2)_nC(O)R^5$, —$(CH_2)_nOR^5$, —$(CH_2O)_n$—$OR^5$, —$(CH_2)_nC(O)$—$O$—$C(O)R^5$, —$(CH_2)_nC(O)NH_2$, —$(CH_2)_nC(O)N$ $HR^5$, —$(CH_2)_nC(O)NR^5R^6$, —$(CH_2)_nNH_2$, —$(CH_2)_nNHR^5$, —$(CH_2)_nNR^5R^6$, —$(CH_2)_nOC(O)NH_2$, —$(CH_2)_nOC(O)NHR^5$, —$(CH_2)_nOC(O)NR^5R^6$, —$(CH_2)_nC(O)Cl$, —$(CH_2)_nSR^5$, —$(CH_2)_nSSR^5$, —$(CH_2)_nSO_2R^5$, —$(CH_2)_nSO_2R^5$, —$(CH_2)_nOSO_2R^5$, —$(CH_2)_nSO_3R^5$, —$(CH_2)_nOSO_3R^5$, —$(CH_2)_nBR^5R^6$, —$(CH_2)_nB(OR^5)(OR^6)$, —$(CH_2)_nB(R^5)(OR^6)$, —$(CH_2)_nN=C=S$, —$(CH_2)_nNCO$, —$(CH_2)_nN(R^5)C(=O)R^6$, —$(CH_2)_nN(R^5)C(=O)(OR^6)$, —$(CH_2)_nCN$, —$(CH_2)_nNO_2$,

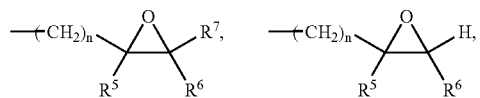

—$(CH_2)_nPR^5R^6$, —$(CH_2)_nP(OR^5)(OR^6)$, —$(CH_2)_nP(R^5)(OR^6)(OR^7)$, —$(CH_2)_nP(=O)R^5R^6$, —$(CH_2)_nP(=O)(OR^5)(OR^6)$ and —$(CH_2)_nP(=O)(R^5)(OR^6)$. As described in the formula, n is an integer of 0 to 10 and each of $R^5$, $R^6$ and $R^7$ is selected from the group consisting of a hydrogen; a $C_1$–$C_{20}$ linear or branched alkyl; a $C_2$–$C_{20}$ alkenyl; a $C_5$–$C_{12}$ cycloalkyl substituted by a $C_1$–$C_{20}$ hydrocarbon or unsubstituted; a $C_6$–$C_{20}$ aryl substituted by a $C_1$–$C_{20}$ hydrocarbon or unsubstituted; a $C_7$–$C_{15}$ aralkyl substituted by a $C_1$–$C_{20}$ hydrocarbon or unsubstituted; and a $C_3$–$C_{20}$ alkynyl.

Unless each of $R^1$, $R^2$, $R^3$ and $R^4$ is a hydrogen, a halogen or a polar functional group, $R^1$ and $R^2$ or $R^3$ and $R^4$ may be connected to form a $C_1$–$C_{10}$ alkylidene group and $R^1$ or $R^2$ may be connected with $R^3$ or $R^4$ to form a $C_4$–$C_{12}$ saturated or unsaturated cyclic group or a $C_6$–$C_{17}$ aromatic cyclic compound.

The method for preparing a cyclic olefin polymer by precipitating the polymer from a polymer solution according to the present invention may be identical with the conventional method, however, it may differ by using a non-solvent added to the polymer solution drop wise to precipitate the polymer slowly. Therefore, the present invention is not affected by the number of carbon atoms of the hydrocarbons of $R^1$, $R^2$, $R^3$ or $R^4$ or by the kind of aryl groups, as in the conventional method.

Preferably, a monomer in which at least one of $R^1$, $R^2$, $R^3$ and $R^4$ is selected from the group consisting of a $C_1$–$C_{20}$ linear or branched alkyl; and a $C_5$–$C_{12}$ cycloalkyl substituted by a $C_1$–$C_{20}$ hydrocarbon or unsubstituted is present at a concentration of at least 5 mol %.

Hereinafter, the preparation method of a cyclic olefin polymer of the present invention is described in more detail.

A cyclic olefin polymer solution is prepared from a cyclic olefin monomer according to the conventional preparation method known in the related art. Then, the polymer is separated from the polymer solution by precipitation or other methods.

In general, polymerization is performed by dissolving monomers in a solvent, adding a catalyst and adjusting the temperature. There are a variety of polymerization methods depending on the kind of the solvent or the catalyst and the temperature. In the present invention, ROMP (ring opening metathesis polymerization), addition polymerization, cationic polymerization, HROMP (ring opening metathesis polymerization followed by hydrogenation), etc. may be applied to prepare a cyclic olefin polymer solution, as shown in Scheme 1 below. However, the present invention is not limited to these examples and any polymerization methods known in the related art may be applied.

(Scheme 1)

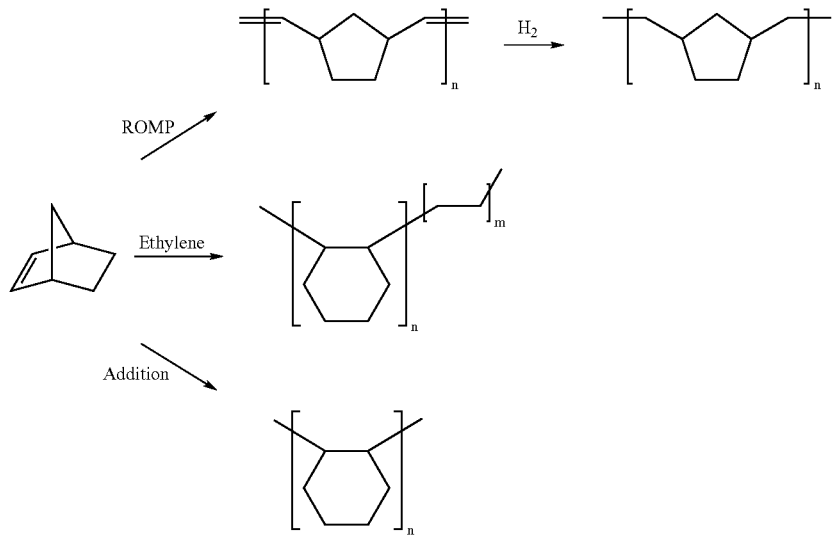

In the polymerization, a transition metal catalyst such as a metallocene compound or a Ni- or Pd-compound may be used. These catalysts offer different polymerization characteristics and polymer structure depending on core metal, ligand and change in catalyst composition.

A cyclic olefin polymer solution prepared in this manner may have any concentration as long as the polymer can be dissolved. But, a concentration of at least 5 wt % is preferable, considering the economic aspect. If the concentration is 80 wt % or above, the polymer may not be dissolved. Thus, it is recommended that the cyclic olefin polymer solution has a concentration of in a range from about 5 wt % to 80 wt %. In some embodiments, it may be preferable for the cyclic olefin polymer solution to have a concentration of olefin polymer in a range from 10 wt % to 60 wt %.

The solvent used in preparation of the polymer solution may be selected from the group consisting of an aromatic compound including toluene, mixed xylene, o-, m- or p-xylene, ethylbenzene, chlorobenzene and benzene and a mixture thereof.

The present invention is characterized in that a non-solvent is slowly added to the cyclic olefin polymer solution drop wise in order to separate the polymer from the polymer solution. Here, the non-solvent refers to a material having a low solubility for the cyclic olefin polymer and being miscible with the solvent of the polymer solution.

Conventionally, a polymer solution was simply mixed with a non-solvent or a polymer solution was poured into a non-solvent to precipitate a polymer from the polymer solution. The present inventors found that, in this case, the polymer precipitates rapidly and a fibery precipitate having a low bulk density is obtained. In the present invention, because a non-solvent is slowly added to the polymer solution drop wise, the polymer precipitates slowly. As a result, uniform and spherical polymer particles having a bulk density are obtained. Since the polymer solution has a high concentration, the amount of solvent used can be decreased, which results in increased productivity. In addition, the amount of the metal catalyst can also be reduced. FIG. 1 is a scanning electron microscope of the spherical polymer particles prepared according to the present invention.

Since the polymer prepared according to the present invention has a large bulk density and is spherical, the polymer slurry containing it can be transferred even with a small amount of a solvent or a non-solvent. When using a conventional method at least 10 equivalents of a non-solvent have to be used when washing the polymer, however, when using the method described herein two to three equivalents are sufficient. In addition, the present invention is advantageous in drying the solvent and reducing packaging volume of the prepared polymer. Also, the polymer prepared by the present invention is advantageous for mixing and compounding.

While the rate of adding a solvent to the cyclic olefin polymer solution is not important, the rate of adding a non-solvent to the diluted polymer is important. If the non-solvent is added too quickly to the diluted polymer solution, fibery, rather than spherical, particles tend to be formed. Even if spherical particles are formed, they tend to be so minute that they do not settle down in the solution, which makes filtering difficult. An adequate addition rate of the non-solvent is dependent upon the size of the reaction bath, addition method, amount of the total polymer solution, etc. For example, if the reaction bath is large, it is recommended to lower the addition rate because it takes time for the non-solvent to be dispersed in the polymer solution. When the non-solvent is sprayed into the polymer solution, the addition rate may be increased. Thus, it is not easy to specify the addition rate of the non-solvent. It is determined by considering the aforementioned conditions.

In an embodiment, the addition rate of the non-solvent per amount of the total polymer solution may be expressed as in Equation 1 below and the rate may be equal to or less than about 2,000 kg/hr/kg. However, as described above, the addition rate is not limited to this range.

Addition rate of non-solvent (kg/hr/kg)=[Amount of added non-solvent (kg)/Addition time (hr)]/ Amount of total polymer solution (kg)   (Equation 1)

Preferably, the addition amount of the non-solvent used is in a range from 1 to 30 equivalents of the solvent in the polymer solution. In a preferred embodiment, is the amount of non-solvent added may be in a range from about 2 to 20 equivalents of the solvent in the polymer solution to minimize loss of the product.

The non-solvent may be selected from the group including, but not limited to acetone; an alcohol such as methanol, ethanol, propyl alcohol, isopropyl alcohol, etc.; an alkane such as hexane, cyclohexane, etc.; a mixture thereof; and its mixture with water.

When adding the non-solvent to the polymer solution, the temperature should not be too high or too low. If the temperature is too low, the polymer becomes less soluble and therefore more solvent has to be used. If the temperature is too high, a high-pressure precipitation bath has to be used because the solvent may boil. Thus, addition temperature of the non-solvent is preferably in a range from −30° C. to 150° C., more preferably −5° C. to 110° C.

The precipitated cyclic olefin polymer may be easily separated by filtering, drying, etc. The filtering or drying condition is not particularly limited. It may be performed by the methods well known in the related art.

The resultant cyclic olefin polymer has a spherical shape and a bulk density of at least 0.1 g/mL, preferably in a range from 0.2 to 0.5 g/mL.

When a metal catalyst is used to prepare a cyclic olefin polymer solution, the obtained polymer contains less metal catalyst than when a polymer solution is added to a non-solvent drop wise or when a non-solvent is mixed with a polymer solution. It is because there is sufficient time for the metal catalyst to be released from the precipitate, as the precipitation takes place slowly.

Hereinafter, the present invention is described in more detail with reference to preferred examples. However, the following examples are only for the understanding of the present invention and the present invention is not limited to or by them.

EXAMPLES

Preparing Example 1

Preparation of
5-butylnorbornene/5-norbornene-2-carboxylic acid butyl ester copolymer solution 5-Butylnorbornene (730 g) and 5-norbornene-2-carboxylic acid butyl ester (940 g) were added to a reactor at room temperature. Then, toluene (1,600 g) was added to the reactor. The air inside the reactor was replaced by nitrogen and the reactor was heated to 90° C. Then, palladium diacetate (0.21 g), dimethyl aniliniumtetrakis (pentafluorophenyl)borate (1.55 g) and tricylcohexylphosphine (0.27 g) dissolved in dichloromethyl were added to the reactor. Reaction was performed for 18 hours while stirring to obtain a polymer solution.

Example 1

40 g of the 5-butylnorbornene/5-norbornene-2-carboxylic acid butyl ester copolymer solution prepared in Preparing Example 1 was added to a reactor. In addition, 40 g of toluene was added to the reactor to dilute the solution. Then, 360 g of acetone was slowly added to the reactor drop wise for 2 hours at room temperature (addition rate=2.1 kg/hr/kg). The stirring rate was 200 rpm. When about 60 g of acetone was added, the polymer began to slowly precipitate. When stirring was stopped, the precipitated polymer settled down and the upper portion of the solution became clear. The polymer slurry was filtered, washed with acetone and dried under reduced pressure at 80° C. to obtain 16.4 g of a white polymer (80.3 wt % of total added monomers). The dried polymer had a bulk density of 0.29 g/mL and an average particle size of 3.5–5 μm. The palladium content was 22 ppm. FIG. 1 is a scanning electron micrograph (5,000×) of the polymer obtained in Example 1.

Example 2

40 g of the 5-butylnorbornene/5-norbornene-2-carboxylic acid butyl ester copolymer solution prepared in Preparing Example 1 was added to a reactor. In addition, 120 g of toluene was added to the reactor to dilute the solution. Then, 840 g of acetone was slowly added to the reactor drop wise for 1 hour at room temperature (addition rate=5.3 kg/hr/kg). The stirring rate was 200 rpm. When about 160 g of acetone was added, the polymer began to slowly precipitate. When stirring was stopped, the precipitated polymer settled down and the upper portion of the solution became clear. The polymer slurry was filtered, washed with acetone and dried under reduced pressure at 80° C. to obtain 16.2 g of a white polymer (79.8 wt % of total added monomers). The dried polymer had a spherical shape, a bulk density of 0.25 g/mL and an average particle size of 2–4 μm. The palladium content was 20 ppm.

Example 3

40 g of the 5-butylnorbornene/5-norbornene-2-carboxylic acid butyl ester copolymer solution prepared in Preparing Example 1 was added to a reactor. 10 g of toluene was added to the reactor to dilute the solution. Then, 180 g of acetone was slowly added to the reactor drop wise for 1 hour at 60° C. (addition rate=3.6 kg/hr/kg). The temperature of the reactor after addition was 26° C. The stirring rate was 160 rpm. When about 30 g of acetone was added, the polymer began to slowly precipitate. When stirring was stopped, the precipitated polymer settled down and the upper portion of the solution became clear. The polymer slurry was filtered, washed with acetone and dried under reduced pressure at 80° C. to obtain 16.6 g of a white polymer (81.3 wt % of total added monomers). The dried polymer had a spherical shape, a bulk density of 0.34 g/mL and an average particle size of 10–20 μm. The palladium content was 24 ppm.

Example 4

40 g of the 5-butylnorbornene/5-norbornene-2-carboxylic acid butyl ester copolymer solution prepared in Preparing Example 1 was heated to 60° C. To the copolymer solution was slowly added 120 g of acetone for 1 hour drop wise (addition rate=3 kg/hr/kg). The temperature of the reactor after addition was 31° C. When stirring was stopped, the precipitated polymer settled down and the upper portion of the solution became clear. The polymer slurry was filtered, washed with acetone and dried under reduced pressure at 80° C. to obtain 16.5 g of a white polymer (80.8 wt % of total added monomers). The dried polymer had a spherical shape, a bulk density of 0.42 g/mL and an average particle size of 15–20 μm. The palladium content was 25 ppm.

Comparative Example 1

Figure 2:
FIG. 2 is a scanning electron micrograph of the amorphous polymer prepared in Comparative Example 1.

120 g of toluene was added to 40 g of the 5-butylnorbornene/5-norbornene-2-carboxylic acid butyl ester copolymer solution prepared in Preparing Example 1 to dilute the solution. The solution was added to a reactor equipped with a stirrer, which contained 1,500 g of ethanol, for 5 hours while stirring. The obtained white copolymer precipitate was filtered, washed with ethanol and dried under reduced pressure at 80° C. to obtain 16.5 g of 5-butylnorbornene/5-norbornene-2-carboxylic acid butyl ester copolymer (80.8 wt % of total added monomers). The polymer had a molecular weight ($M_w$) of 123,000. The ratio $M_w/M_n$ of was 2.36. The polymer had an irregular fluffy, fibery shape and a bulk density of 0.08 g/mL. The palladium content was 50 ppm. FIG. 2 is a scanning electron micrograph (1,500×) of the polymer prepared in Comparative Example 1.

Comparative Example 2

The same process of Comparative Example 1 was applied, except for using acetone as non-solvent instead of ethanol, to obtain 16.2 g of a white 5-butylnorbornene/5-norbornene-2-carboxylic acid butyl ester copolymer (79.3 wt % of total added monomers). The obtained polymer had an irregular fluffy, fibery shape and a bulk density of 0.09 g/mL. The palladium content was 45 ppm.

Comparative Example 3

40 g of the 5-butylnorbornene/5-norbornene-2-carboxylic acid butyl ester copolymer solution prepared in Preparing Example 1 was diluted with 120 g of toluene and 840 g of acetone was slowly added for 1 hour at room temperature drop wise. The stirring rate of the reactor was 200 rpm. Long fluffy polymer particles were precipitated. The polymer slurry was filtered, washed with acetone and dried under reduced pressure at 80° C. to obtain 37 g of a white polymer. The dried polymer had a bulk density of 0.08 g/mL. The palladium content was 48 ppm.

Comparative Example 4

40 g of the 5-butylnorbornene/5-norbornene-2-carboxylic acid butyl ester copolymer solution prepared in Preparing Example 1 was added to a reactor. 120 g of toluene was added to the reactor to dilute the solution. Then, 840 g of acetone was quickly poured into the reactor in 5 seconds (addition rate=3,780 kg/hr/kg). The stirring rate was 160 rpm. Stirring was stopped when the polymer precipitated. The upper portion of the solution became unclear because fine particles floated in the solution. It took a long time to filter the polymer slurry (3 hours or more). The polymer slurry washed with acetone and dried under reduced pressure at 80° C. to obtain 16.3 g of a white polymer (79.8 wt % of total added monomers). The dried polymer had a spherical shape and a bulk density of 0.17 g/mL. There were some fibery particles among spherical particles. The palladium content was 35 ppm.

Preparing Example 2

(Preparation of 5-butylnorbornene/5-norbornene-2-carboxylic acid butyl ester/5-norbornene-2-carboxylic acid methyl ester tricopolymer solution)

5-Butylnorbornene (35.8 g), 5-norbornene-2-carboxylic acid butyl ester (31.1 g) and 5-norbornene-2-carboxylic acid methyl ester (60.9 g) were added to a reactor at room temperature. Toluene (95.8 g) was added to the reactor. Air inside the reactor was replaced by nitrogen and the reactor was heated to 90° C. Palladium diacetate (22.4 mg), dimethyl aniliniumtetrakis (pentafluorophenyl)borate (160.2 mg) and tricylcohexylphosphine (28 mg) dissolved in dichloromethyl were added to the reactor. Reaction was performed for 18 hours while stirring to obtain a tricopolymer solution comprising 30 mol % of 5-butylnorbornene, 20 mol % of 5-norbornene-2-carboxylic acid butyl ester and 50 mol % of 5-norbornene-2-carboxylic acid methyl ester monomers. 287 g of toluene was added to dilute the solution. The copolymer had a molecular weight ($M_w$) of 175,000. The proportion of $M_w/M_n$ was 2.13.

Example 5

237 g of the tricopolymer solution prepared in Preparing Example 2 was added to a reactor. 1,100 g of toluene was added drop wise to the reactor, while stirring the reactor at 200 rpm (addition rate=2.32 kg/hr/kg). When stirring was stopped, the precipitated polymer settled down and the upper portion of the solution became clear. The polymer slurry was filtered, washed with acetone and dried under reduced pressure at 80° C. to obtain 37 g of a white polymer. The dried polymer had a spherical shape, a bulk density of 0.41 g/mL and an average particle size in a range between 0.8–1.2 μm. The palladium content was 28 ppm.

Comparative Example 5

6,000 g of ethanol was added to a reactor at room temperature. 237 g of the tricopolymer solution prepared in Preparing Example 2 was added to a reactor. 247 g of the tricopolymer solution prepared in Preparing Example 2 was added to the reactor drop wise, while stirring the reactor at 250 rpm. Long fluffy polymer particles precipitated. The polymer slurry was filtered, washed with ethanol and dried under reduced pressure at 80° C. to obtain 38 g of a white polymer. The dried polymer had a spherical shape and a bulk density of 0.08. The palladium content was 50 ppm.

Preparing Example 3

(Preparation of 5-butylnorbornene/5-norbornene-2-carboxylic acid butyl ester/5-norbornene-2-carboxylic acid methyl ester tricopolymer solution)

5-Butylnorbornene (9.8 kg), 5-norbornene-2-carboxylic acid butyl ester (8.5 kg) and 5-norbornene-2-carboxylic acid methyl ester (16.7 kg) were added to a reactor at room temperature. Toluene (26.3 kg) was added to the reactor. Air inside the reactor was replaced by nitrogen and the reactor was heated to 90° C. Palladium diacetate (6.2 g), dimethyl aniliniumtetrakis (pentafluorophenyl)borate (44.1 g) and tricylcohexylphosphine (7.7 g) dissolved in dichloromethyl were added to the reactor. Reaction was performed for 18 hours while stirring to obtain a tricopolymer solution comprising 30 mol % of 5-butylnorbornene, 20 mol % of 5-norbornene-2-carboxylic acid butyl ester and 50 mol % of 5-norbornene-2-carboxylic acid methyl ester monomers. 43.9 kg of toluene was added to dilute the solution.

Example 6

The tricopolymer solution prepared in Preparing Example 3 was added to a reactor. 420 kg of acetone was added to the reactor drop wise at room temperature for 4 hours, while stirring the reactor at 60 rpm (addition rate=2.39 kg/hr/kg). When stirring was stopped, the precipitated polymer settled down and the upper portion of the solution became clear. The polymer slurry was filtered, washed with acetone and dried under reduced pressure at 80° C. to obtain 23 kg of a white polymer. The dried polymer had a spherical shape, a bulk density of 0.42 g/mL and an average particle size in a range from 0.5–0.8 μm. The palladium content was 25 ppm. The copolymer had a molecular weight ($M_w$) of 147,000. The proportion of $M_w/M_n$ was 2.19.

Preparing Example 4

Preparation of 5-butylnorbornene/5-norbornene-2-carboxylic acid butyl ester/5-norbornene-2-carboxylic acid methyl ester tricopolymer solution 5-Butylnorbornene (35.8 g), 5-norbornene-2-carboxylic acid butyl ester (46.6 g) and 5-norbornene-2-carboxylic acid methyl ester (48.7 g) were added to a reactor at room temperature. Toluene (98.3 g) was added to the reactor. Air inside the reactor was replaced by nitrogen and the reactor was heated to 90° C. Palladium diacetate (22.4 mg), dimethyl aniliniumtetrakis (pentafluorophenyl)borate (160.2 mg) and tricylcohexylphosphine (28.0 mg) dissolved in dichloromethyl were added to the reactor. Reaction was performed for 18 hours while stirring to obtain a tricopolymer solution comprising 30 mol % of 5-butylnorbornene, 20 mol % of 5-norbornene-2-carboxylic acid butyl ester and 50 mol % of 5-norbornene-2-carboxylic acid methyl ester monomers. 287 g of toluene was added to dilute the solution.

Example 7

The tricopolymer solution prepared in Preparing Example 4 was added to a reactor. 2,360 g of acetone was slowly added drop wise at room temperature for 30 minutes (addition rate=16.45 kg/hr/kg) while stirring the reactor at 150 rpm. When stirring was stopped, the precipitated polymer settled down and the upper portion of the solution became clear. The polymer slurry was filtered, washed with acetone and dried under reduced pressure at 80° C. The dried polymer had a spherical shape and a bulk density of 0.39 g/mL. The palladium content was 25 ppm. The copolymer had a molecular weight ($M_w$) of 179,000. The proportion of $M_w/M_n$ was 2.30.

Preparing Example 5

Preparation of 5-butylnorbornene/5-norbornene-2-methyl acetate/5-norbornene-2-carboxylic acid methyl ester tricopolymer solution 5-Butylnorbornene (22.4 g), 5-norbornene-2-methyl acetate (16.3 g) and 5-norbornene-2-carboxylic acid methyl ester (22.8 g) were added to a reactor at room temperature.

Toluene (280 g) was added to the reactor. Air inside the reactor was replaced by nitrogen and the reactor was heated to 90° C. Palladium diacetate (44.9 mg), dimethyl anilinium tetrakis (pentafluorophenyl)borate (320.5 mg) and tricyclohexylphosphine (56.1 mg) dissolved in dichloromethyl were added to the reactor. Reaction was performed for 18 hours while stirring to obtain a tricopolymer solution comprising 15 mol % of 5-butylnorbornene, 70 mol % of 5-norbornene-2-methyl acetate and 15 mol % of 5-norbornene-2-carboxylic acid methyl ester monomers.

Example 7

The tricopolymer solution prepared in Preparing Example 5 was added to a reactor. 1,960 g of acetone was slowly added drop wise at room temperature for 90 minutes (addition rate=8.09 kg/hr/kg) while stirring the reactor at 150 rpm. When stirring was stopped, the precipitated polymer settled down and the upper portion of the solution became clear. The polymer slurry was filtered, washed with acetone and dried under reduced pressure at 60° C. The dried polymer had a spherical shape and a bulk density of 0.38 g/mL. The palladium content was 20 ppm. The copolymer had a molecular weight ($M_w$) of 230,000. The proportion of $M_w/M_n$ was 2.50.

Physical properties of the polymers prepared in Examples and Comparative Examples are summarized in Table 1 below.

TABLE 1

| | Polymer shape | Bulk density (g/mL) | Palladium content (ppm) |
|---|---|---|---|
| Comparative Example 1 | Fluffy and fibery | 0.08 | 50 |
| Comparative Example 2 | Fluffy and fibery | 0.09 | 45 |
| Comparative Example 3 | Long and fluffy | 0.08 | 48 |
| Comparative Example 4 | Some fibery particles exist among spherical particles | 0.17 | 35 |
| Comparative Example 5 | Long and fluffy | 0.08 | 50 |
| Example 1 | Spherical | 0.29 | 22 |
| Example 2 | Spherical | 0.25 | 20 |
| Example 3 | Spherical | 0.34 | 24 |
| Example 4 | Spherical | 0.42 | 25 |
| Example 5 | Spherical | 0.41 | 28 |
| Example 6 | Spherical | 0.42 | 25 |
| Example 7 | Spherical | 0.39 | 25 |
| Example 8 | Spherical | 0.38 | 20 |

The present invention provides a spherical cyclic olefin polymer having a high bulk density by adding a non-solvent to a cyclic olefin polymer solution drop wise, so that precipitation of the cyclic olefin polymer takes place slowly.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing a cyclic olefin polymer having a high bulk density comprising the steps of:
   a) polymerizing cyclic olefin monomers or a cyclic olefin monomer with ethylene to prepare a cyclic olefin polymer solution;
   b) slowly adding a non-solvent in a drop wise manner to the cyclic olefin polymer solution to precipitate a cyclic olefin polymer, wherein the addition rate of the non-solvent is equal to or less than 2000 kg/hr per total amount of the polymer solution (kg), and the addition amount of the non-solvent is in a range from 1 to 30 equivalents of the solvent of the polymer solution; and
   c) filtering and drying the precipitated cyclic olefin polymer.

2. The method for preparing a cyclic olefin polymer of claim 1, wherein the cyclic olefin polymer is selected from the group consisting of a homopolymer prepared from norbornene based monomers, which are represented by Chemical Formula 1 below; a copolymer of different monomers, which are represented by Chemical Formula 1; and a copolymer prepared from a norbornene based monomer represented by Chemical Formula 1 and ethylene:

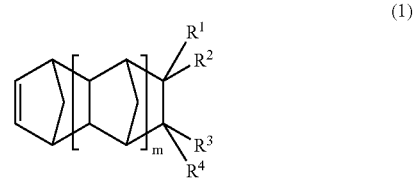

(1)

where
m is an integer of 0 to 4;
each of $R^1$, $R^2$, $R^3$ and $R^4$ is selected from the group consisting of a $C_1$–$C_{20}$ linear or branched alkyl, a $C_2$–$C_{20}$ alkenyl or vinyl; a $C_5$–$C_{12}$ cycloalkyl substituted by a $C_1$–$C_{20}$ hydrocarbon or unsubstituted; a $C_6$–$C_{20}$ aryl substituted by a $C_1$–$C_{20}$ hydrocarbon or unsubstituted; a $C_7$–$C_{15}$ aralkyl substituted by a $C_1$–$C_{20}$ hydrocarbon or unsubstituted; a $C_3$–$C_{20}$ alkynyl; and a polar functional group selected —$(CH_2)_nC(O)OR^5$, —$(CH_2)_nOC(O)R^5$, —$(CH_2)_nOC(O)OR^5$, —$(CH_2)_nC(O)R^5$, —$(CH_2)_nOR^5$, —$(CH_2O)_n$—$OR^5$, —$(CH_2)_nC(O)$—$O$—$C(O)R^5$, —$(CH_2)_nC(O)NH_2$, —$(CH_2)_nC(O)NHR^5$, —$(CH_2)_nC(O)NR^5R^6$, —$(CH_2)_nNH_2$, —$(CH_2)_nNHR^5$, —$(CH_2)_nNR^5R^6$, —$(CH_2)_nOC(O)NH_2$, —$(CH_2)_nOC(O)NHR^5$, —$(CH_2)_nOC(O)NR^5R^6$, —$(CH_2)_nC(O)Cl$, —$(CH_2)_nSR^5$, —$(CH_2)_nSSR^5$, —$(CH_2)_nSO_2R^5$, —$(CH_2)_nSO_2R^5$, —$(CH_2)_nOSO_2R^5$, —$(CH_2)_nSO_3R^5$, —$(CH_2)_nOSO_3R^5$, —$(CH_2)_nBR^5R^6$, —$(CH_2)_nB(OR^5)(OR^6)$, —$(CH_2)_nB(R^5)(OR^6)$, —$(CH_2)_nN$=$C$=$S$, —$(CH_2)_nNCO$, —$(CH_2)_nN(R^5)C(=O)R^6$, —$(CH_2)_nN(R^5)C(=O)(OR^6)$, —$(CH_2)_nCN$, —$(CH_2)_nNO_2$,

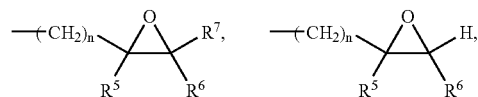

—$(CH_2)_nPR^5R^6$, —$(CH_2)_nP(OR^5)(OR^6)$, —$(CH_2)_nP(R^5)(OR^6)(OR^7)$, —$(CH_2)_nP(=O)R^5R^6$, —$(CH_2)_nP(=O)(OR^5)(OR^6)$ and —$(CH_2)_nP(=O)(R^5)(OR^6)$, wherein n is an integer of 0 to 10 and each of $R^5$, $R^6$ and $R^7$ is selected from the group consisting of a hydrogen; a $C_1$–$C_{20}$ linear or branched alkyl; a $C_2$–$C_{20}$ alkenyl; a $C_5$–$C_{12}$ cycloalkyl substituted by a $C_1$–$C_{20}$ hydrocarbon or unsubstituted; a $C_6$–$C_{20}$ aryl substituted by a $C_1$–$C_{20}$ hydrocarbon or unsubstituted; a $C_7$–$C_{15}$ aralkyl substituted by a $C_1$–$C_{20}$ hydrocarbon or unsubstituted; and a $C_3$–$C_{20}$ alkynyl; and unless each of $R^1$, $R^2$, $R^3$ and $R^4$ is a hydrogen, a halogen or a polar functional group, $R^1$ and $R^2$ or $R^3$ and $R^4$ may be connected to form a $C_1$–$C_{10}$ alkylidene group and $R^1$ or $R^2$ may be connected with $R^3$ or $R^4$ to form a $C_4$–$C_{12}$ saturated or unsaturated cyclic group or a $C_6$–$C_{17}$ aromatic cyclic compound.

3. The method for preparing a cyclic olefin polymer of claim 2, wherein the cyclic olefin polymer comprises at least 5 mol % of a monomer, in which at least one of $R^1$, $R^2$, $R^3$ and $R^4$ in Chemical Formula 1 is a $C_1$–$C_{20}$ linear or branched alkyl or a $C_5$–$C_{12}$ cycloalkyl substituted by a $C_1$–$C_{20}$ hydrocarbon or unsubstituted.

4. The method for preparing a cyclic olefin polymer of claim 1, wherein the cyclic olefin polymer solution comprises 5–80 wt % of a polymer.

5. The method for preparing a cyclic olefin polymer of claim 1, wherein the non-solvent is selected from the group consisting of an alkane, an ether compound, and a mixture thereof.

6. The method for preparing a cyclic olefin polymer of claim 1, wherein the step b) is performed at a temperature in a range between –30° C. to 150° C.

7. A cyclic olefin polymer having a bulk density of 0.1–0.6 g/mL, which is prepared by the method of claim 1.

* * * * *